United States Patent
Chang

(10) Patent No.: US 7,194,031 B2
(45) Date of Patent: Mar. 20, 2007

(54) RATE CONTROL METHOD WITH REGION OF INTERESTING SUPPORT

(75) Inventor: Yung-Ching Chang, Kao Hsiung County (TW)

(73) Assignee: Silicon Integrated Systems Corp., Hsin-chu (TW)

( * ) Notice: Subject to any disclaimer, the term of this patent is extended or adjusted under 35 U.S.C. 154(b) by 798 days.

(21) Appl. No.: 10/614,858

(22) Filed: Jul. 9, 2003

(65) Prior Publication Data
US 2005/0008075 A1 Jan. 13, 2005

(51) Int. Cl.
*H04N 7/12* (2006.01)

(52) U.S. Cl. .................................. 375/240.03

(58) Field of Classification Search ..............................
375/24.03–240.07, 240.12–240.16, 240,
375/240.24; H04N 7/12
See application file for complete search history.

(56) References Cited

U.S. PATENT DOCUMENTS

| | | | | |
|---|---|---|---|---|
| 5,699,119 A * | 12/1997 | Chung et al. | ........... | 375/240.24 |
| 6,094,455 A * | 7/2000 | Katta | .................... | 375/240.05 |
| 6,181,742 B1 * | 1/2001 | Rajagopalan et al. | .. | 375/240.03 |
| 6,192,075 B1 * | 2/2001 | Jeng et al. | ................... | 375/240 |
| 6,310,915 B1 * | 10/2001 | Wells et al. | ........... | 375/240.03 |
| 6,522,693 B1 * | 2/2003 | Lu et al. | ................. | 375/240.05 |

* cited by examiner

*Primary Examiner*—Richard Lee
(74) *Attorney, Agent, or Firm*—Birch, Stewart, Kolasch & Birch, LLP

(57) ABSTRACT

A rate control method with region of interesting support, which coding macroblocks in a current picture with different priority. The rate control method calculates a weighted macroblock activity according to the priority and a macroblock activity and a picture activity for the current picture according to the weighted macroblock activity. Then, the method allocates a bit budget for each macroblock according to the priority and calculates an estimated complexity for the current picture according to a complexity of a previously coded picture, an activity of the previously coded picture and the weighted macroblock activity. The method also calculates an estimated quantizer scale according to the estimated complexity and the bit budget, an initial virtual buffer occupancy according to an reaction factor and the estimated quantizer scale and a macroblock quantizer scale according to a virtual buffer occupancy of a previously coded macroblock, the priority and the reaction factor. The method codes each macroblock according to the macroblock quantizer scale and updates a virtual buffer occupancy of the current coded macroblock according to a used bit of the coded macroblock, the virtual buffer occupancy of the previously coded macroblock and the bit budget of current coded macroblock.

13 Claims, 3 Drawing Sheets

|   | 0 | 1 | 2 | 3 | 4 | 5 | 6 | 7 |
|---|---|---|---|---|---|---|---|---|
| 0 | 8 | 16 | 19 | 22 | 26 | 27 | 29 | 34 |
| 1 | 16 | 16 | 22 | 24 | 27 | 29 | 34 | 37 |
| 2 | 19 | 22 | 26 | 27 | 29 | 34 | 34 | 38 |
| 3 | 22 | 22 | 26 | 27 | 29 | 34 | 37 | 40 |
| 4 | 22 | 26 | 27 | 29 | 32 | 35 | 40 | 48 |
| 5 | 26 | 27 | 29 | 32 | 35 | 40 | 48 | 58 |
| 6 | 26 | 27 | 29 | 34 | 38 | 46 | 56 | 69 |
| 7 | 27 | 29 | 35 | 38 | 46 | 56 | 69 | 83 |

FIG. 1 (PRIOR ART)

| 1.0 | 1.0 | 1.0 | 1.0 | 1.0 | ... |
|---|---|---|---|---|---|
| 1.0 | 1.0 | 2.0 | 2.0 | 2.0 | ... |
| 1.0 | 2.0 | 2.0 | 2.0 | 2.0 | ... |
| 1.0 | 2.0 | 2.0 | 2.0 | 2.0 | ... |
| | | | | | |

FIG. 2

| 8 | 8 | 8 | 8 | 8 | ... |
|---|---|---|---|---|---|
| 8 | 8 | 4 | 4 | 4 | ... |
| 8 | 4 | 4 | 4 | 4 | ... |
| 8 | 4 | 4 | 4 | 4 | ... |
| | | | | | |

FIG. 3

RATE CONTROL METHOD WITH REGION OF INTERESTING SUPPORT

BACKGROUND OF THE INVENTION

1. Field of the Invention

The invention relates to a rate control method with region of interesting support for increasing the image quality of the region of interesting.

2. Description of the Related Art

Compressing methods are typically used to compress the pictures in order to reduce the data amounts, for example coding pictures by MPEG. The basic unit of coding within a picture is the macroblock. If the sampling is in 4:2:0 format, there are six blocks within a macroblock: four Y blocks, one Cb block and one Cr block. Each block is first DCT (discrete cosine transform) transformed, and then the DCT coefficients have to be quantized into integer. A zigzag scan or other alternate scanning method is utilized to arrange the two-dimensional quantized coefficients into one-dimensional. Finally, a variable-length coding (VLC) is employed to do entropy coding.

The quantization step is where the compression happened. Generally, the quantization of a DCT coefficient $F[v][u]$ can be represented as:

$$QF[v][u]=16*F[v][u]/(Q*W[v][u]) \qquad (1)$$

Where the v, u are the indexes for the two dimensional matrix, ranged from 0 to 7. The Q is the quantizer scale for the blocks within a macroblock, which can be varied for each macroblock. The $W[v][u]$ is a quantization matrix defined for the whole pictures, which is used to assign a weighting factor for different DCT coefficients. FIG. 1 is a default quantization matrix for intra blocks defined in MPEG-2. Referring to FIG. 1, the $W[v][u]$ is getting larger when the v and u indexes increase. This causes that the quantized coefficients with higher frequency more easily becomes zero. This is based on the study of human visual system that human is more sensitive to lower frequency signal and less sensitive to higher frequency.

Generally, an encoder treats an image as a single object to encode. The visual quality of the whole image would be uniform. However, in some applications, we would like a dedicate region of the image to be coded with a better quality than other region. The surveillance system is a good example. Typically, there are multiple cameras connected to a single recording system. The images came form these cameras are shrunk and merged into a single image. Thus, a single recording system can be used to record the images of multiple cameras. However, if we think that some cameras should have higher priority than other cameras, the traditional recording system can't satisfy this requirement. Another example is the encoding of video sequence with captions blending onto the images. Because the caption is frozen over some images but the background is moving, the ringing artifact around the caption becomes obviously. If this area is given more bit rate, the overall visual quality of the image could become better. The region on an image that we want to get a better quality than other region is called the region of interesting (ROI).

However, because the target bit rate for a video sequence is constrained, and thus the bit budget for each picture is a limited resource, how to allocate the bit budget for each region according to its priority to achieve the effect of ROI that user required is not a trivial problem.

SUMMARY OF THE INVENTION

In view of the above-mentioned problems, an object of the invention is to provide a rate control method with region of interesting support for increasing the image quality of the region of interesting.

To achieve the above-mentioned object, the rate control method with region of interesting support comprises the steps of:

a) calculating a weighted activity $WAct\_i$ for each macroblock of the current picture according to the priority $Pri\_i$ and an activity $Act\_i$ of each macroblock;

b) calculating a picture activity $Act\_C$ for the current picture according to the weighted activity $WAct\_i$;

c) allocating a bit budget $BB_i$ for each macroblock according to the priority $Pri\_i$;

d) calculating an estimated complexity $EstCom\_C$ for the current picture according to a complexity $Com\_X$ of a last coded picture, an activity $Act\_X$ of the coded picture and the picture activity $Act\_C$;

e) calculating an estimated quantizer scale $EstQ\_C$ according to the estimated complexity $EstCom\_C$ and the bit budget $BB\_C$;

f) calculating an initial virtual buffer occupancy $D0$ according to a reaction factor $R\_X$ and the estimated quantizer scale $EstQ\_C$;

g) calculating a macroblock quantizer scale $Q_i$ for each macroblock according to a virtual buffer occupancy $D_{i-1}$, of a last coded macroblock, the priority $Pri\_i$ of each macroblock and the reaction factor $R\_X$;

h) coding each macroblock according to the macroblock quantizer scale $Q_i$; and i) updating a virtual buffer occupancy $D_i$ of the current coded macroblock according to a used bit $UB_i$ of the current coded macroblock, the virtual buffer occupancy $D_{i-1}$ of the last coded macroblock and the bit budget $BB_i$ of the current coded macroblock.

BRIEF DESCRIPTION OF THE DRAWINGS

FIG. 1 is a default quantization matrix for intra blocks defined in MPEG-2.

FIG. 2 illustrates a priority table of macroblocks with different priority on an image of the present invention.

FIG. 3 illustrates a quantizer scale table translated from the priority table of FIG. 2.

DETAILED DESCRIPTION OF THE INVENTION

Figure 4:
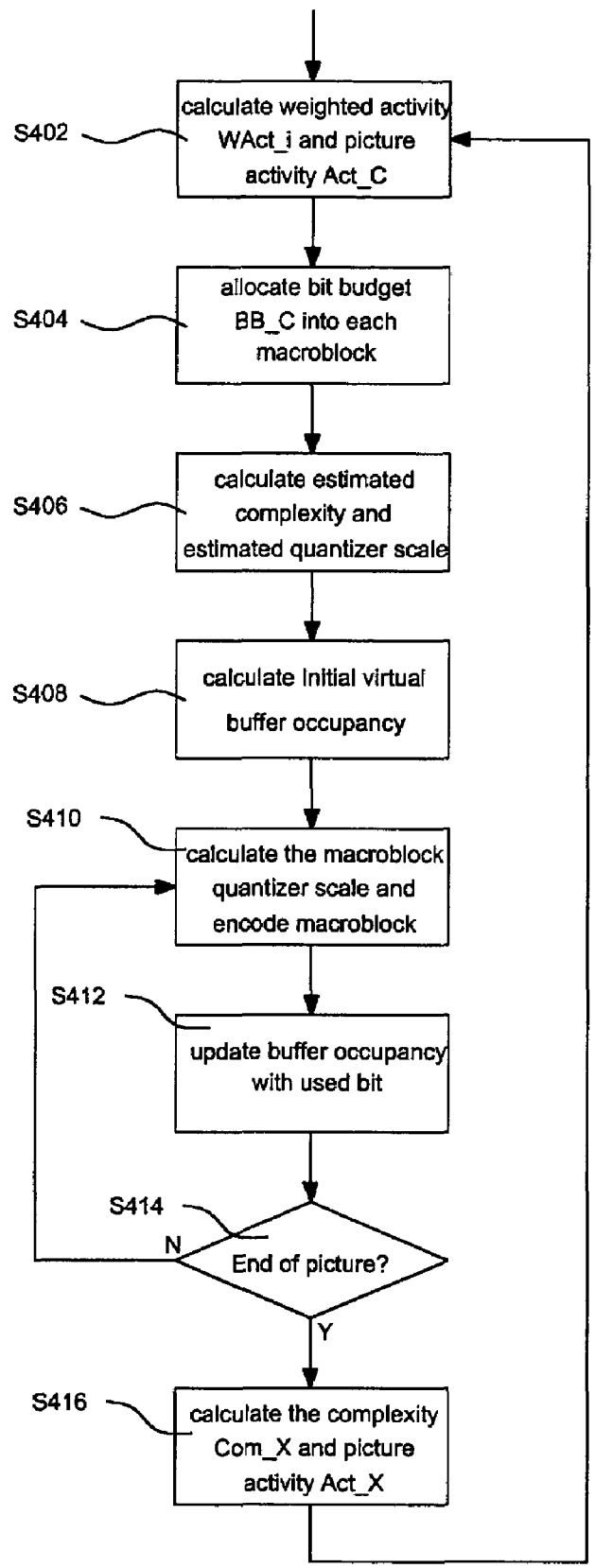
FIG. 4 is a flow chart for the rate control method with region of interesting support of the present invention.

The rate control method with region of interesting support of the present invention will be described with reference to the accompanying drawings.

In MPEG, if a macroblock is quantized by a smaller quantizer scale, the quality should become better. Therefore, using this character, the present invention of rate control method with region of interesting support assigns higher priority for the region of interesting (ROI) and encodes the macroblocks on the ROI with smaller quantizer scale. FIG. 2 illustrates a priority table of macroblocks with different priority on an image. In FIG. 2, each block is defined as a macroblock and is assigned a priority $Pri\_i$. For example, the oval area is defined as a ROI in the FIG. 2, and priority $Pri\_i$ at the macroblocks in the oval area are 2, other macroblocks outside the oval area are 1. FIG. 3 illustrates a quantizer scale table translated from the priority table of FIG. 2. In FIG. 3, the quantizer scale of macroblocks with priority of 1 is 8, and the quantizer scale of macroblocks with priority of 2 is 4, which is half of the quantizer scale of macroblocks with priority of 1. Therefore, the macroblocks with priority of 2 can get higher quality.

Based on the bit rate constraint, the encoder allocates a target bit budget for a picture. The encoder has to encode each macroblock with a suitable quantizer scale so as to control the actually used bits closed to the target bit budget. With the requirement of ROI, the encoder has not only to control the bit rate but also the quality of each macroblock.

The activity of a picture has to be calculated before actually coding the picture. The activity of a picture is the sum of activities of all macroblocks in the picture. For an intra-coded macroblock, the activity is the sum of the variance of the four-luminance blocks. For an inter-coded macroblock, the activity is the sum of the variance of the four residual blocks. The activity Act of a macroblock is then weighted by the priority of this macroblock to become the weighted activity WAct_i. The activity of a picture is actually the sum of the weighted activity WAct_i of all macroblocks in a picture. After coding a picture, the average quantizer scale Avg_Q and the actually used bits UB can be known, and the complexity Com of this coded picture is calculated as:

$$Com = Avg\_Q * UB \quad (1)$$

After coding a picture of type X (X can be I-, P- or B-picture), the activity and complexity of this picture is used to update the picture activity of type X Act_X and the picture complexity of type X Com_X. Using the activity Act_X and the complexity Com_X of the previously coded picture of type X and the activity Act_C of the current picture, the estimated complexity EstCom_C of the current picture of type X can be calculated as:

$$EstCom\_C = Act\_C * Com\_X / Act\_X \quad (2)$$

The estimated quantizer scale EstQ_C of the current picture can be calculated as:

$$EstQ\_C = EstCom\_C / BB\_C \quad (3)$$

where the BB_C is the target bit budget allocated for the current picture.

The estimated quantizer scale EstQ_C is the default quantizer scale for the macroblocks with the priority of 1. So if a macroblock has a priority of Pri_i, the quantizer scale for this macroblock would be EstQ_C/Pri_i. The higher the priority is, the lower the quantizer scale for this macroblock.

However, the estimated quantizer scale EstQ_C would be not so correct, and if we use the fixed EstQ_C to encode the picture, there would be some difference between the actually used bits and the target bit budget. A feedback mechanism called virtual buffer is employed to control the bit consumption.

A reaction factor R_X for the picture of type X is defined. Typically the reaction factor is set as 2*bit_rate/frame_rate. Before coding a picture of type X, the initial virtual buffer occupancy D0 is set as R_X/31*EstQ_C. The target bit budget BB_C is pre-allocated for each macroblock according to the weighted activity WAct_i of each macroblock. The encoder encodes each macroblock i with the macroblock quantizer scale $Q_i$ as:

$$Q_i = D_{i-1} * 31 / R\_X / Pri\_i \quad (4)$$

After coding a macroblock i, the virtual buffer occupancy is updated with the pre-allocated bit budget BB_i for this macroblock and the used bits UB_i of this macroblock:

$$D_i = D_{i-1} + UB\_i - BB\_i \quad (5)$$

If the used bit budget UB_i is larger than the pre-allocated bit budget BB_i for a macroblock, the virtual buffer occupancy increases and the quantizer scale $Q_i$ for the next macroblock becomes higher. In contrast, if the used bits UB_i are smaller than the bit budget BB_i, the quantizer scale $Q_i$ for the next macroblock becomes lower. Finally, after coding a picture, the average quantizer scale Avg_Q and the used bits UB_C of the current picture are obtained and the complexity Com_C for the current picture can be calculated.

FIG. 4 is a flow chart for the rate control method with region of interesting support of the present invention. Referring to FIG. 4, the steps of the present invention includes:

Step S402: calculate the weighted activity WAct_i and the picture activity Act_C. First, the encoder calculates the activity Act_i for each macroblock MB_i and calculates the weighted activity WAct_i according to the priority Pri_i and the activity Act_i. For example, the WAct_i=Act_i*Pri_i. Then, the encoder calculates the picture activity Act_C by summing the weighted activity WAct_i.

Step S404: allocate the bit budget BB_i for each macroblock for the current picture. Allocate the bit budget BB_C into bit budget BB_i of each macroblock MB_i according to the weighted activity WAct_i.

Step S406: calculate the estimated complexity EstCom_C and the estimated quantizer scale EstQ_C of the current picture. The encoder calculates the estimated complexity EstCom_C according to the activity Act_C of the current picture, the activity Act_X of the previously coded picture and the complexity Com_X of previously coded picture, like the equation (2). Then, the encoder calculates the estimated quantizer scale EstQ_C according to the estimated complexity EstCom_C and bit budget BB_C of the current picture, like the equation (3).

Step S408: calculate the initial virtual buffer occupancy D0. The encoder calculates the initial virtual buffer occupancy D0 according to the reaction factor R_X and the estimated quantizer scale EstQ_C. That is, the initial virtual buffer occupancy D0 is calculated by the following equation.

$$D0 = R\_X / 31 * EstQ\_C.$$

Step S410: calculate the macroblock quantizer scale $Q_i$ for each macroblock and encode each macroblock. The encoder calculates the macroblock quantizer scale $Q_i$ according to the virtual buffer occupancy $D_{i-1}$ of previously coded macroblock, the reaction factor R_X and the priority Pri_i, like the equation (4). Then, the encoder encodes the macroblock using the macroblock quantizer scale $Q_i$.

Step S412: update the virtual buffer occupancy $D_i$. When a macroblock is encoded completely, the encoder updates the virtual buffer occupancy $D_i$ according to the virtual buffer occupancy $D_{i-1}$ of previously coded macroblock, the bit budget BB_i of current macroblock and the used bits UB_i of the current macroblock, like equation (5).

Step S414: check the coding state. If all the macroblocks are coded completely, the encoder jumps to step S416, otherwise jumps back to step S410.

Step S416: update the complexity Com_X and activity Act_X. When the current picture is coded completely, the encoder updates the complexity Com_X according to the used bit UB_C of current coded picture and the average quantizer scale Avg_Q. Then, assign the activity Act_C of current coded picture to the activity Act_X. The complexity Com_X is calculated by the following equation.

$$Com\_X = Avg\_Q * UB\_C.$$

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A rate control method with region of interesting support, which codes macroblocks in a current picture with different priority $Pri\_i$, the rate control method comprising the steps of:

calculating a weighted macroblock activity $WAct\_i$ for each macroblock of the current picture according to the priority $Pri\_i$ and a macroblock activity $Act\_i$;

calculating a picture activity $Act\_C$ for the current picture according to the weighted macroblock activity $WAct\_i$;

allocating a bit budget $BB\_i$ for each macroblock according to the priority $Pri\_i$ and a bit budget $BB\_C$ of the current picture;

calculating an estimated complexity $EstCom\_C$ for the current picture according to a complexity $Com\_X$ of a previously coded picture, a picture activity $Act\_X$ of the previously coded picture and the picture activity $Act\_C$ of the current picture;

calculating an estimated quantizer scale $EstQ\_C$ according to the estimated complexity $EstCom\_C$ and the bit budget $BB\_C$;

calculating an initial virtual buffer occupancy $D0$ according to a reaction factor $R\_X$ and the estimated quantizer scale $EstQ\_C$;

calculating a macroblock quantizer scale $Q_i$ according to a virtual buffer occupancy $D_{i-1}$, of a previously coded macroblock, the priority $Pri\_i$ and the reaction factor $R\_X$;

encoding each macroblock according to the macroblock quantizer scale $Q_i$; and updating a virtual buffer occupancy $D_i$ of a current coded macroblock according to a used bit $UB\_i$ of the current coded macroblock, the virtual buffer occupancy $D_{i-1}$, of the previously coded macroblock and the bit budget $BB_i$ of the current coded macroblock.

2. The rate control method with region of interesting support of claim 1, further comprising the steps of:

updating the complexity $Com\_X$ according to a used bits $UB\_C$ of a coded picture and an average quantizer scale $Avg\_Q$; and assigning the picture activity $Act\_C$ of the current coded picture to the picture activity $Act\_X$.

3. The rate control method with region of interesting support of claim 2, wherein the weighted activity $WAct\_i$ is calculated by the equation:

$$WAct\_i = Act\_i * Pri\_i.$$

4. The rate control method with region of interesting support of claim 3, wherein the picture activity $Act\_C$ is the sum of the weighted macroblock activity $WAct\_i$ of all macroblocks.

5. The rate control method with region of interesting support of claim 2, wherein the estimated complexity $EstCom\_C$ is calculated by the equation:

$$EstCom\_C = Act\_C * Com\_X / Act\_X.$$

6. The rate control method with region of interesting support of claim 5, wherein the estimated quantizer scale $EstQ\_C$ is calculated by the equation:

$$EstQ\_C = EstCom\_C / BB\_C.$$

7. The rate control method with region of interesting support of claim 6, wherein the initial virtual buffer occupancy $D0$ is calculated by the equation:

$$D0 = R\_X / 31 * EstQ\_C.$$

8. The rate control method with region of interesting support of claim 7, wherein the macroblock quantizer scale $Q_i$ is calculated by the equation:

$$Q_i = D_{i-1} * 31 / R\_X / Pri_i.$$

9. The rate control method with region of interesting support of claim 8, wherein the virtual buffer occupancy $D_i$ of the current coded macroblock is calculated by the equation:

$$D_i = D_{i-1} + UB_i - BB_i.$$

10. The rate control method with region of interesting support of claim 9, wherein the complexity $Com\_X$ of the coded picture is calculated by the equation:

$$Com\_X = Avg\_Q * UB\_C.$$

11. The rate control method with region of interesting support of claim 9, wherein the macroblock activity $Act\_i$ of an intra-coded macroblock is the sum of the variance of four luminance blocks of the macroblock.

12. The rate control method with region of interesting support of claim 9, wherein the macroblock activity $Act\_i$ of an inter-coded macroblock is the sum of the variance of four residual blocks for the macroblock.

13. The rate control method with region of interesting support of claim 1, wherein the macroblocks with larger priority $Pri\_i$ are the region of interesting.

* * * * *